H. F. KNAPP.

Removing Bars of Rivers.

No. 8,204. Reissued April 30, 1878.

1

UNITED STATES PATENT OFFICE.

HENRY F. KNAPP, OF NEW YORK, N. Y.

IMPROVEMENT IN REMOVING BARS OF RIVERS.

Specification forming part of Letters Patent No. 195,896, dated October 9, 1877; Reissue No. 8,204, dated April 30, 1878; application filed April 11, 1878.

*To all whom it may concern:*

Be it known that I, HENRY F. KNAPP, of the city, county, and State of New York, have invented an Improved Process for Deepening the Bars at the Mouths of Harbors and Rivers, of which the following is a specification:

The invention first consists in erecting or arranging one or more lines of walls or barriers on the outside of the bar and across the direction of the flow of the river into the sea, the top of which barriers shall be on a level lower than the top of the bar to be cut away, in order to give clearance to any vessels passing in and out over them, which top shall also be considerably elevated above the bed-bottom of the sea on which the barriers are placed, in order to present the proper amount of impediment or interference to wave action, which is the cause of bar formation. This will be better comprehended when it is known that two contrary forces always exist at the mouth of every river or harbor discharging into the ocean or sea, viz., one force to cut out, and the other force to close up the mouth. Remove either of these forces, and the other must have unimpeded action either to close the river completely or entirely remove the bar, according to which force is removed, the bar being only an indication or measure of the two opposing forces.

Wave action being the cause of bar formation, it is only necessary to interfere with or stop this action of the waves on the sea-bed outside the bar in order to stop them throwing up the sand into the mouth of the river, and thereby forming the bar. When this action is stopped, then the force of the outward river-current has full sway and sweep to cut away any sand or mud impediment at its mouth, and the river can therefore maintain its full cross-section directly into the sea.

The invention also consists in making these barriers movable or adjustable to meet the gradual extension of the mouth of a delta river into the sea, if such should be found an economical method; and the invention further consists in a novel manner of securing piles by injecting a liquid cement into the sand around their outside, to secure them from being washed away by the action of the sea.

Similar letters of reference indicate corresponding parts in all the figures of the accompanying drawings, which form a part of this specification.

Figure 1:
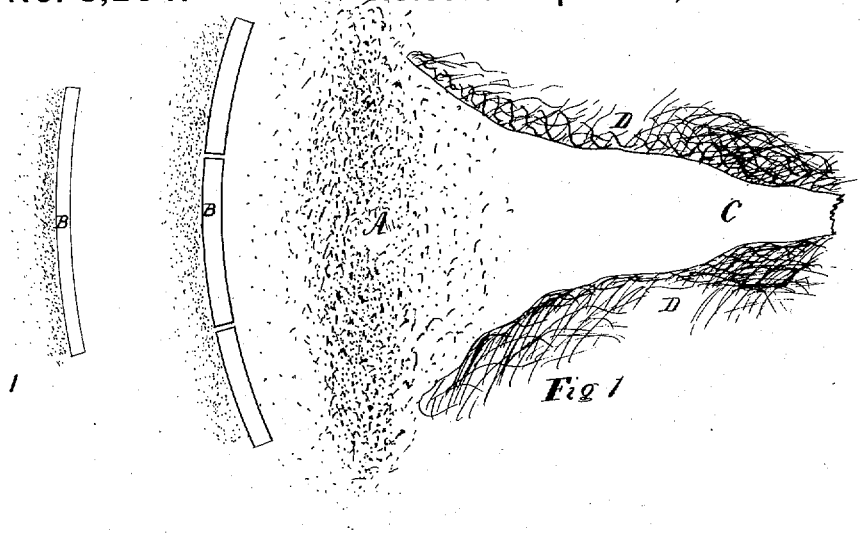
Figure 3:
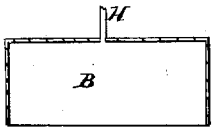
Figure 4:
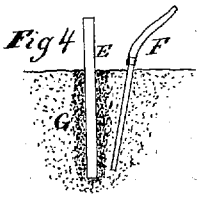
Figure 2:
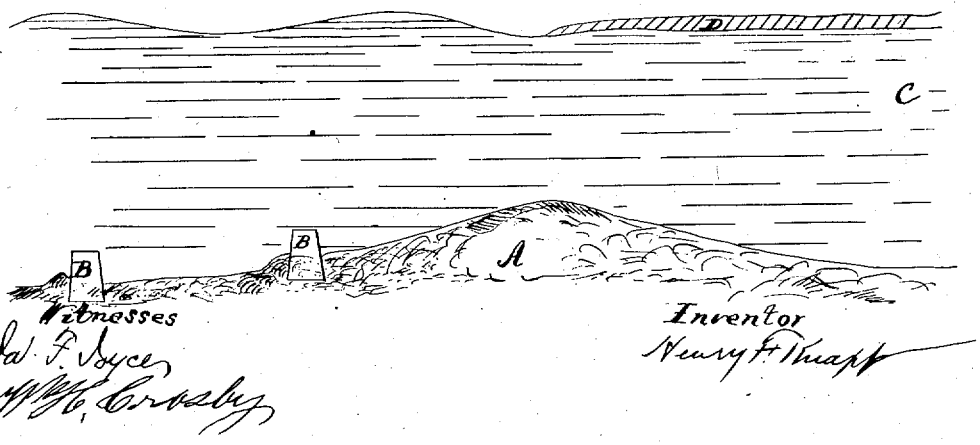

Figure 1 represents a plan view of river, bar, barriers, &c., showing the wave-interfering barriers to be constructed directly across the mouth or channel and outside the bar; Fig. 2, a longitudinal sectional view of same; Fig. 3, a vertical sectional view of barrier on an enlarged scale. Fig. 4 represents a sectional view of manner of cementing piles in sand.

A represents the bar of a river, C, running between the banks or shores D. The velocity of the river-current always tends to cut away this bar, but the action of the sea-waves always tends to maintain it by washing upon it solid matter. To stop this action of the sea-waves, the walls or barriers B are arranged across the mouth of the river, outside the bar, and having considerable altitude above the sandy bottom, so as to present a barrier, which, being effected, leaves the current of the river to erode the bar without counteraction, while the top or apex of the barrier shall be submerged below the surface of the water to as great a depth as it is desired to reduce the top or apex of the river-bar.

To effect this obstruction economically, in some cases open-bottomed caissons may be used, as they are better adapted to be movable or adjustable, and may be made secure by being sucked into the sand about one-half their depth.

B, Fig. 3, represents a caisson with suction-hose H attached.

As a certain amount of piling is requisite in hydraulic operations of this sort, I secure my piles in the sand by injecting a liquid cement around them by means of tube F, Fig. 4, E representing the pile, and thereby form a mass of concrete, G, around it. The same may be done with the sand in or around the caissons or barriers B, and thus form a more solid and permanent construction.

What is here claimed, and desired to be secured by Letters Patent, is—

1. The method herein described of reducing or cutting away bars at the mouths of rivers and harbors, which consists in arranging obstructions, walls, or barriers in one or more lines directly across the mouth on the outside of the bar, in order to prevent the sea-waves washing up sand or sediment onto the bar, and permit the river-current to erode the bar.

2. The process of injecting a cement in a semi-fluid state into the mud or sand around piles, for the purpose of more firmly securing them.

HENRY F. KNAPP.

Witnesses:
JA. F. JOYCE,
W. H. CROSBY.